United States Patent

Brotz

[11] Patent Number: 5,871,678
[45] Date of Patent: Feb. 16, 1999

[54] METHOD OF PRODUCING REFUSE MEMBER STRUCTURES

[76] Inventor: Gregory R. Brotz, P.O. Box 1322, Sheboygan, Wis. 53081

[21] Appl. No.: 865,987

[22] Filed: May 30, 1997

[51] Int. Cl.⁶ .................................................. B29C 70/00
[52] U.S. Cl. .......................... 264/113; 264/115; 264/128; 264/463; 264/911
[58] Field of Search ..................... 264/113, 115, 264/128, 460, 463, 911

[56] References Cited

U.S. PATENT DOCUMENTS

| | | | |
|---|---|---|---|
| 3,661,662 | 5/1972 | Allen | 264/128 |
| 4,377,543 | 3/1983 | Strohbeen et al. | 264/128 |
| 5,169,571 | 12/1992 | Buckley | 264/128 |
| 5,266,250 | 11/1993 | Kroyer | 264/128 |

*Primary Examiner*—Jan H. Silbaugh
*Attorney, Agent, or Firm*—William Nitkin

[57] ABSTRACT

A method of processing refuse wherein layers of resin-coated pulverized refuse are cross-blended, compressed, heated, recompressed, shaped and cured to form useful structural members.

6 Claims, 4 Drawing Sheets

METHOD OF PRODUCING REFUSE MEMBER STRUCTURES

BACKGROUND OF THE INVENTION

1. Field of the Invention

The method of this invention resides in the area of the manufacture of structural beams out of refuse and more particularly relates to a method of manufacture of structural beams, panels and shapes made of refuse particulate produced by the agglomerate grinding of landfill material joined together at points of contact by resin.

2. Description of the Prior Art

Recycling of refuse has become important in today's conservation-minded society. Prior art processes exist for the recycling of waste metals, glass, plastic, and paper into a wide variety of forms for reuse.

SUMMARY OF THE INVENTION

In the United States approximately 200 million tons of municipal waste are produced each year. The major bulk of municipal waste is placed in landfills. Most landfills are not lined and thus pollute the surrounding countryside from leachate or liquid waste which is produced when liquids percolate through the refuse and flow into the ground water or runoff of rain water.

The following illustrates the typical refuse makeup of a landfill site

|  | Percent by Weight |
| --- | --- |
| Paper and cardboard | 41 |
| Yard waste | 18 |
| Plastic | 4.8 |
| Glass | 2.4 |
| Ferrous metals | 4.8 |
| Aluminum | 0.8 |
| Other | 28.2 |

It is an object of this invention to utilize processed refuse from landfills which refuse is held together by a hardened resin to construct strong, structural beams and members. If the compaction step of the process is not very forceful when the processed material is passed under the compaction roller, porous, lightweight structural members can be produced.

It is a further object of this invention to make such structural beams and members by depositing the resin-soaked processed refuse particulate into a mold cavity with its particles in an irregular-meshing and intercrossing fashion which particles contact one another at various points. The mold cavity can be, for example, in the shape of an I-beam. Square beams, round beams and panels can also be molded continuously in continuous belt molding machines.

The method of this invention in general consists of bringing portable processing machines to a landfill site first to dig up the refuse and, without sorting it, feed it into a large crusher, such as of the dual rotor type. A second pulverization step may be necessary to reduce the particle size of the material even further. Portable impactors are available that can pulverize 900 tons of material per hour. It is important to homogenize the particulate material because, as the bulldozers dig in various areas of the landfill site, the concentrations of the refuse materials will vary. This step can be accomplished by loading the pulverized particulate material into a large vertical hopper equipped with an air cannon at its bottom. A high-pressure pulse of air can be injected a few times to mix the various ingredients sufficiently. The hopper can be equipped with a full bottom hinged door that can be swung open to allow the pulverized particulate material to fall out and pass into a feed hopper. The pulverized particulate material can be stored in multiple feed hoppers equipped with feed augers, and the material can be cross-blended for further homogenization. The feed hoppers can also be equipped with air cannons for homogenizing their contents. The feed hoppers can be positioned in-line to feed out the pulverized particulate material onto a moving conveyor belt. The material from any feed hopper positioned further along the conveyor belt is laid on top of the material laid down earlier by the previous feed hopper in a continuous fashion to cross-blend the material. The conveyor belt can be of the screen belt variety.

The material is then coated with a bonding resin. The conveyor system can be equipped with side walls so that the material builds vertically during the cross-blending step. The material on the conveyor belt passes through a recirculating system that pours a resin and water solution onto the top of the material which penetrates through the material bed and falls out from the screen belt where it is collected and pumped back into the resin solution holding tank for reuse.

The material then moves on the screen conveyor belt and that runs over a sturdy force floor. The floor has perforations to allow excess resin and water solution to flow therethrough. A powered roller is positioned above the perforated floor and is lowered to a point so that it compresses the material, thus forcing out any excess solution. If the resin solution is very viscous, it can be entered onto the material between each feed hopper during the cross-blending step. During the compaction step of the process of this invention, the compaction force will distribute the resin solution throughout the pulverized particulate material.

The resins utilized can be of any generic type. However, because one of the objects of this invention is to produce a biologically stable product, single-stage thermal-setting resins not requiring a curing agent are desirable. Phenolic resins can be used and are known to be carbonizable. During carbonization of a phenolic resin, the phenolic resin is heated in a retort without oxygen, causing its molecules to cleave off the oxygen and hydrogen, leaving the carbon to form in one of its forms which include char, graphite, and glassy. Although the products of this invention can be carbonized to produce useful articles, the production of carbonized structures is not the primary goal of this invention. It is known that phenolic resins retain their physical properties very well at high temperatures. It is an object of this invention to utilize high temperatures in the manufacturing of useful products in order to sterilize the waste materials and thus render them impervious to biological degradation, both internally and externally.

After any excess resin solution is pressed out of the resin-coated, pulverized particulate material, the material can either be molded directly into a structural member, such as a beam; or the material, once hardened by curing, can be broken up into particles for molding shapes.

If a structural member, such as a beam, is to be formed directly, there are two methods of accomplishing this process. Because of the water content left within the interior of the resin-coated, pulverized particulate material, heating and pressing it will produce a product that is likely to be of poor quality. The steam pressure produced internally creates so much stress that the molded part will burst upon the release of the molding pressure. The following processes help to avoid this problem.

Process A

The pressed material is entered by conveyor into a microwave oven, and the pressed material is allowed to swell up as the steam escapes, taking away the residual water left from the resin solution addition stage. As the last of the steam is escaping, the mass is passed under a series of compression rollers having conventional tunnel heaters disposed therebetween. The historesis of the phenolic resin is that it can be heated at 212 degrees F. for a short time, but still not be fully set. As the hot material passes through the first compression roller, the roller compacts the material, forcing out the gas between the resin-coated particles and causing the particles to come in contact with each other and bond. At this point in the process there is still some water vapor left to escape, and the product expands a little. More heat is added in the tunnel heater and after the material is pressed again, the compacting is complete. The beam thus produced can go through another tunnel heater and roller, if needed. The beam can be cut to a desired length and allowed to cool, or it can be placed in an oven to complete the curing/setting process. It should be noted that the density of the final product can be controlled by the gap between the roller and the conveyor floor.

Process B

After one roller pressing, as described above, heavy metal blocks can be placed on top of the material, and the assembly moves through a tunnel conveyor. When the assembly exits the tunnel, the blocks are removed and the beam is cut to the desired length.

If the material is to be molded into shapes, the pressed material is reshredded or pulverized and placed into a drying hopper where warm air is passed through the material until all of the residual water is removed. The particulate material can then be placed into molds and compression molded. Structural members useful for items such as embankment stabilization structures, gardening ground cover members, fence posts and even maintenance sheds can be made from the products of the process of this invention. It higher resin-content waste and slag from coal-fired electrical generating plants are combined in the process of this invention, a rigid product suitable for use as a railroad tie can be produced.

DESCRIPTION OF THE PREFERRED EMBODIMENT(S)

Figure 1:
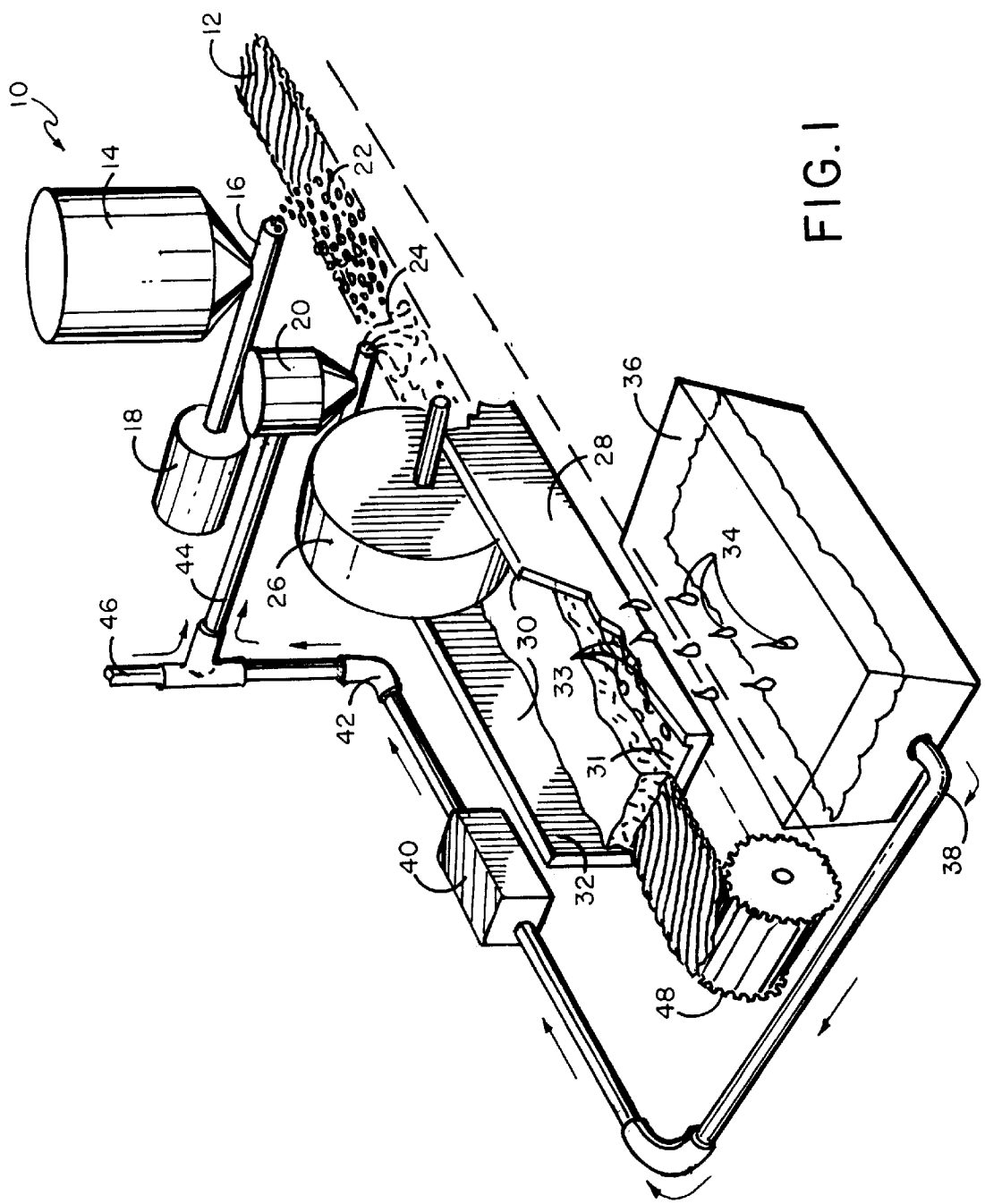
FIG. 1 illustrates a perspective view of one embodiment of the refuse processing equipment of this invention.

The method of this invention utilizes processing machines 10 receiving particulate refuse 22 which can be stored in hopper 14, as seen in FIG. 1. Particulate refuse 22 is delivered onto a screen mesh conveyor belt 12 having apertures therein to allow for the flow therethrough of excess liquid resin 34, as described below. Feed auger 16 driven by motor 18 drives the particulate refuse 22 onto screen mesh conveyor belt 12 where it moves under a flow of liquid resin 24 which soaks into and around particulate refuse 22. This mixture passes under compression roller 26 above force floor 31 within a channel having sides 30 where the mixture is formed into a compressed, flat, elongated shape having sides, with excess liquid resin 34 draining downward through the screen mesh of the conveyor belt and through apertures 33 in force floor 31 into catch basin 36. Resin in catch basin 36 is passed along first resin return pipe 38 through pump 40 and along resin return pipe 42 where it joins with new resin pipe 46 which can allow for additional resin to be added to make up for resin used to bind the refuse particulate material which resin mixture passes along resin hopper feed pipe 44 to resin hopper 20 where it is dispensed onto refuse particulate material 22. Conveyor belt 12 can be driven by drive wheels, such as drive wheel 48, with the resulting compressed, resin-coated refuse beam 32 coming off the belt or continuing for further processing, such as through a tunnel heater.

Figure 2:
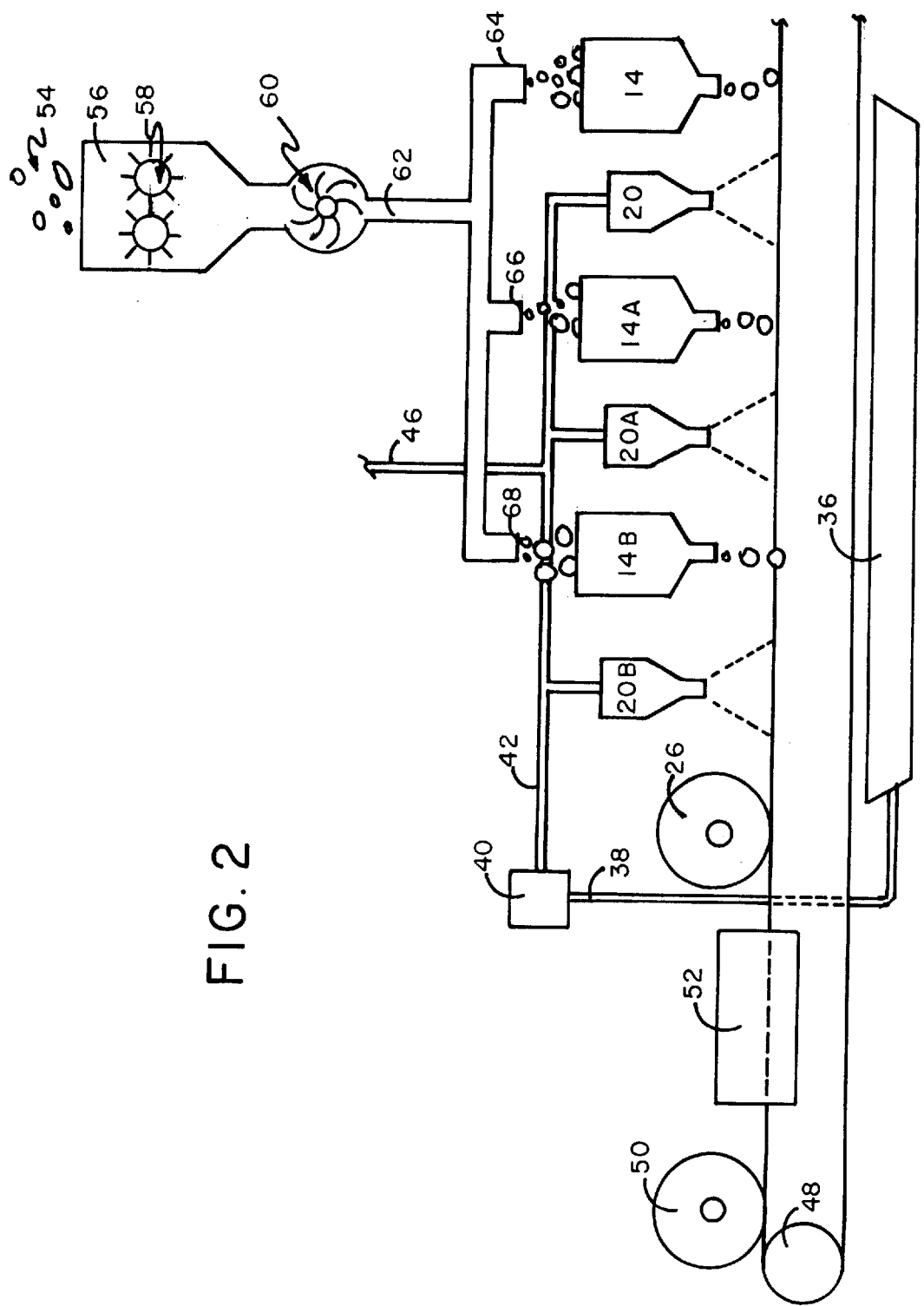
FIG. 2 illustrates a side view of the processing equipment of this invention utilizing multiple hoppers and microwave oven processing.

FIG. 2 illustrates a side view of the processing equipment of this invention similar to that shown in FIG. 1 but utilizing a second and third refuse hopper 14a and 14b, respectively; and second and third resin hoppers 20a and 20b, respectively. Refuse 54 can be entered into refuse receipt hopper 56 and pulverized by rollers 58 before being driven down feed pipe 62 by impellor 60 to multiple outlets 64, 66 and 68 disposed above refuse hoppers 14, 14a and 14b, respectively. In FIG. 2 the compressed resin-soaked mixture is passed through microwave oven 52 where it is heated and passed under second compression roller 50, as described above.

Figure 3:
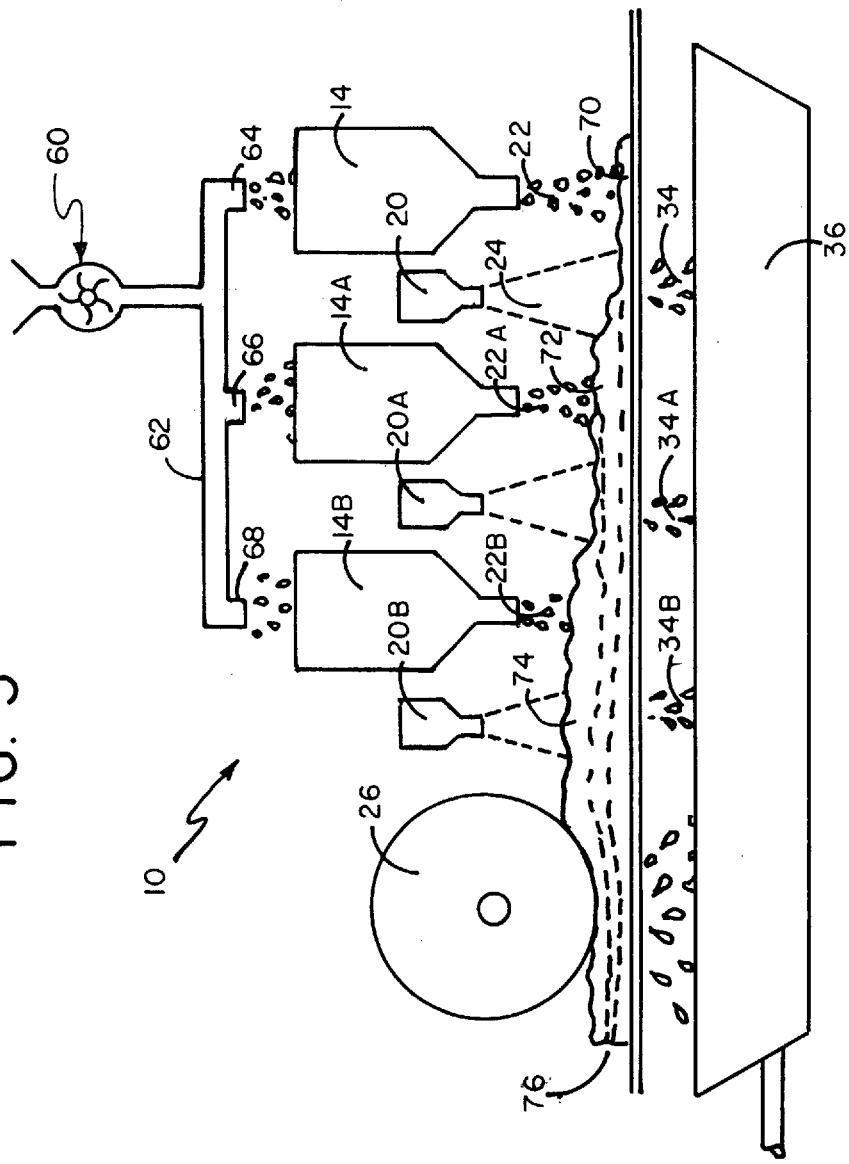
FIG. 3 illustrates the side view of the processing equipment of this invention utilizing multiple hoppers to create multiple layers which are compressed before microwave oven processing.

FIG. 3 illustrates a side view of the equipment utilized in the process of this invention showing the multiple, cross-blended layers of resin-soaked refuse particulate material being formed by the use of multiple refuse hoppers and resin hoppers. In this embodiment refuse layer 70 is laid down by refuse hopper 14; refuse layer 72, by refuse hopper 14a; and refuse layer 74, by refuse hopper 14b, all of which layers are compressed by compression roller 26 wherein the layered compressed molding 76 can continue for processing into microwave oven 52 or equivalent heating means.

The formation of layers, one above the other, builds structures such as the elongated beam shown in FIG. 1 with sides formed by side walls 30 of trough 28. It should be noted, however, that the structures thus formed can also be molded into other types of molded shapes.

Figure 4:
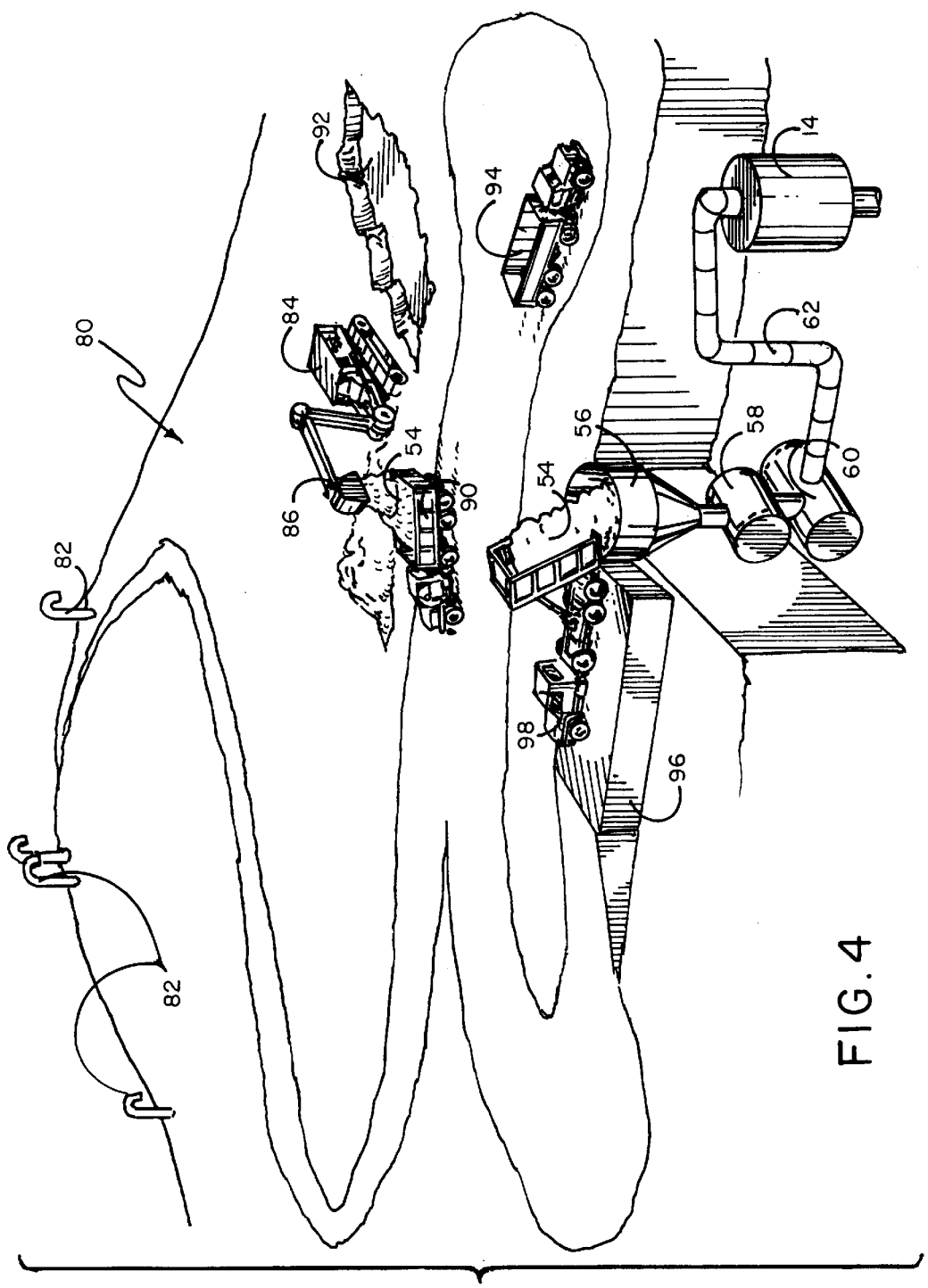
FIG. 4 illustrates a perspective view of the process of this invention being carried out in an area containing refuse, such as a landfill.

The process of this invention can be carried out on site, such as in a landfill, as seen in FIG. 4, which has typical vents 82 and where a front end loader 84 can scoop refuse from the landfill, such as from area 92, into trucks such as truck 90 which are then filled with refuse 54. The process can be continuous with empty trucks, such as truck 94 awaiting loading. Filled trucks, such as truck 98, can be driven onto ramp platform 96 to dump refuse 54 into a refuse receipt hopper 56 which refuse then passes through pulverizing rollers 58 into an impellor 60 which moves the refuse through feed pipe 62 into refuse hopper 14 where it can be further processed, as described above.

Although the present invention has been described with reference to particular embodiments, it will be apparent to those skilled in the art that variations and modifications can be substituted therefor without departing from the principles and spirit of the invention.

I claim:

1. The process of producing refuse structural members, comprising the steps of:

collecting refuse;

pulverizing said refuse into pulverized particulate material;

entering said pulverized particulate material into at least one refuse hopper;

homogenizing said pulverized particulate material;

entering said pulverized particulate material onto a conveyor belt;

soaking said pulverized particulate material with a liquid resin to form a resin-soaked particulate mixture first layer;

compressing said resin-soaked particulate mixture layer;

draining excess resin from said resin-soaked particulate mixture layer;

producing a compressed resin-coated mass; and heating said resin-coated mass.

2. The process of claim 1 further including the steps of: further compressing said heated resin-coated mass; and curing said resin.

3. The process of claim 2 further including, before the step of curing said resin, the step of molding said resin-coated mass into a desired shape.

4. The process of claim 1 further including, before the step of compressing said resin-soaked particulate mixture first layer, the steps of entering at least one additional layer of resin-coated pulverized particulate material on top of said first layer of resin-coated pulverized particulate material and cross-blending said additional layer to said first layer.

5. The process of claim 4 further including the steps of:

providing multiple layers of resin-coated pulverized particulate material, one layer on top of the other before said first compression step;

cross-blending each additional layer to the previous layer and curing said resin.

6. The process of claim 5 further including, before the step of curing said resin, the step of molding said resin-coated mass to a desired shape.

* * * * *